United States Patent Office 3,408,347
Patented Oct. 29, 1968

3,408,347
PYRIDO-[1,2-b] [1,2]BENZOTHIAZIN-10,11-(7H,10aH)-
DIONE 5,5-DIOXIDES AND 7,8-DIHYDROPYRI-
DO-[1,2-b] [1,2]BENZOTHIAZIN - 10,11 - (9H,10aH)-
DIONE 5,5-DIOXIDES AND PROCESS FOR THEIR
PRODUCTION
John Shavel, Jr., Mendham, N.J., and Harold Zinnes,
Rockaway, N.Y., assignors to Warner-Lambert Pharmaceutical Company, Morris Plains, N.J., a corporation of Delaware
No Drawing. Filed Apr. 20, 1966, Ser. No. 543,821
13 Claims. (Cl. 260—243)

ABSTRACT OF THE DISCLOSURE

This invention relates to novel heterocyclic compounds having the following formulas:

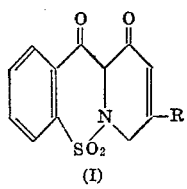 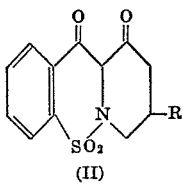
(I) (II)

wherein R is hydrogen, lower alkyl or aryl. These compounds exhibit antifungal activity against *T. mentagrophytes* and *M. canis*.

---

This invention relates to novel heterocyclic compounds of the formula:

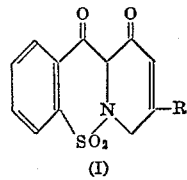 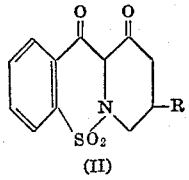
(I) (II)

wherein R is hydrogen, lower alkyl such as methyl, ethyl, propyl, isopropyl, butyl, isobutyl and the like or aryl such as phenyl and the like.

The compounds of this invention have the following numbering system:

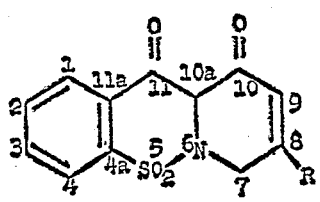

The compounds of this invention exhibit antifungal activity against *T. mentagrophytes* and *M. canis*.

In order to use these compounds about 1 part by weight of the compounds of this invention is blended with about 99 parts by weight of an inert carrier such as starch, talc or petrolatum and applied topically.

The symbol R as used hereinafter has the same meaning as defined.

According to the process of this invention, when R is alkyl or aryl, these compounds are prepared by reacting a compound of the structure:

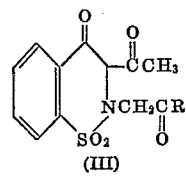
(III)

with isopropyl iodide and potassium carbonate in refluxing acetone to give a compound of the structure:

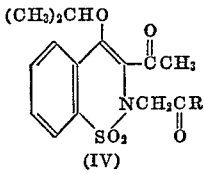
(IV)

The starting Compound III is fully described and claimed in our copending application Serial No. 418,552 filed on December 15, 1964, now abandoned.

Compound IV is generally not isolated as such but is allowed to cyclize under the same conditions to give compounds of structure (V) below:

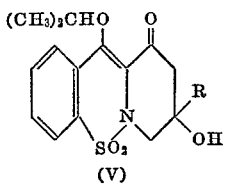
(V)

Compound V is then dissolved in concentrated sulfuric acid to effect ether cleavage and dehydration to yield compounds corresponding to the structure (I) above.

Compound II of this invention may be conveniently obtained from Compound I by hydrogenation in the presence of a suitable hydrogenation catalyst. The foregoing reactions may be illustrated in the following schematic diagram:

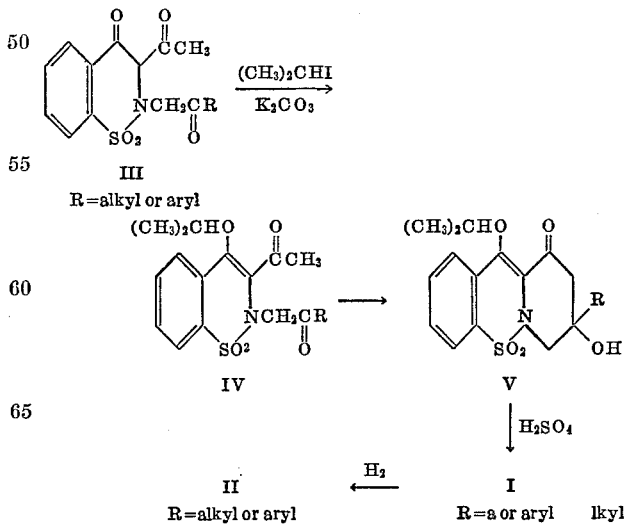

The process for the production of the compounds of this invention wherein R=H uses as starting material a compound of the structure:

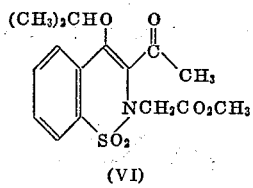

which is reacted with ethylene glycol and p-toluenesulfonic acid in refluxing benzene to give a compound of the structure:

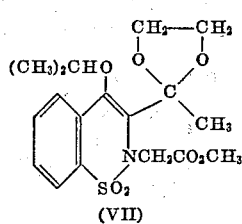

The preparation of Compound VI is fully described in our copending application Serial No. 450,183 filed on April 22, 1966, now abandoned.

Reduction of Compound VII with lithium aluminum hydride yields a compound of the formula:

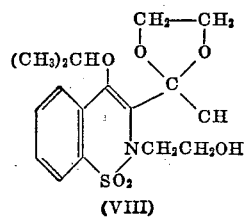

Further treatment of Compound VIII with dimethylsulfoxide, pyridine hydrochloride and dicyclohexylcarbodiimide followed by treatment with an aqueous solution of a mineral acid yields a compound of the structure:

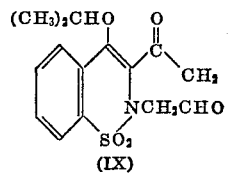

Compound IX is then converted to Compound X of the formula:

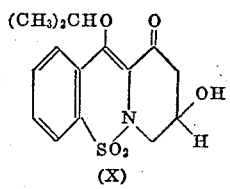

by reaction with potassium carbonate in refluxing acetone. The crude Compound X may be converted to Compound I wherein R=H by dissolving X in concentrated sulfuric acid. Again, as in the case wherein R is alkyl or aryl, Compound II wherein R=H may be obtained from Compound I wherein R=H, by catalytic hydrogenation.

These foregoing reactions may be illustrated in the following diagram:

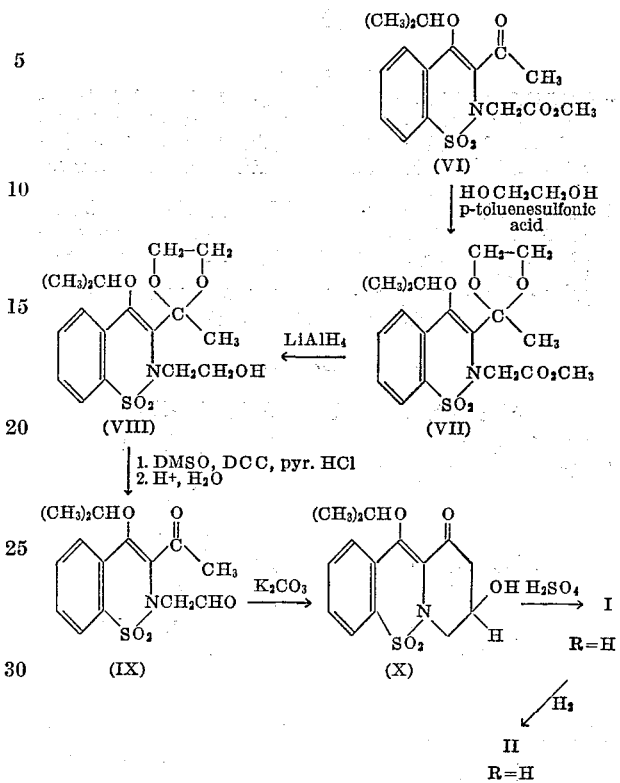

The following examples are included in order further to illustrate the invention.

All temperatures given in the examples are degrees centigrade. Room temperature is about 20° to about 30° C.

EXAMPLE 1.—7,8 - DIHYDROPYRIDO[1,2 - b][1,2] BENZOTHIAZIN - 10,11 - (9H,10aH) - DIONE 5,5-DIOXIDE

A slurry of 2.0 g. (0.0076 mol) of pyrido[1,2-b][1,2]benzothiazin - 10,11 - (7H,10aH) - dione 5,5 - dioxide in 200 ml. of glacial acetic acid is hydrogenated for 6 hours at room temperature and atmospheric pressure using 200 mg. of 10% palladium on carbon as the catalyst. The acetic acid is removed from the filtered solution at a maximum temperature of 35°, using a rotary flash evaporator. Trituration of the residue with water gives 1.7 g. of tannish yellow solid which is recrystallized from isopropyl alcohol. Removal of the first crop of brownish material and concentration of the mother liquor gives 0.7 g. of 7,8 - dihydropyrido[1,2-b][1,2]benzothiazin - 10,11 - (9H,10aH) - dione 5,5 - dioxide, M.P. 118°–131° dec., which is recrystallized from methanol. Removal of the first crop and concentration of the mother liquor gives 0.27 g. of yellow crystalline product, M.P. 141°–152° dec. Recrystallization from methanol gives an analytical sample, M.P. 141.5°–142.5° dec. Ultraviolet maxima at 258 ($\epsilon$7800) and 378 m$\mu$ ($\epsilon$9300); infrared absorption at 1620 (m), 1585 (s), and 1555 (s) cm.$^{-1}$.

Analysis for $C_{12}H_{11}NO_4S$.—Calc.: C, 54.33; H, 4.18; N, 5.28; S, 12.09. Found: C, 54.16; H, 4.24; N, 5.07; S, 12.05.

EXAMPLE 2.—PYRIDO[1,2 - b][1,2]BENZOTHIAZIN - 10,11(7H,10aH) - DIONE 5,5 - DIOXIDE

A mixture of 20 g. (0.062 mol) of 3-acetyl-4-isopropoxy - 2H - 1,2 - benzothiazin - 2 - acetaldehyde 1,1 - dioxide, 40 g. of anhydrous potassium carbonate and 2000 ml. of acetone is refluxed with vigorous stirring for 2.5 hours and then filtered. Evaporation of the filtrate gives a dark gum which is triturated with petroleum ether; infrared absorption at 3400 and 1695 cm.$^{-1}$. The gum is dissolved in 340 ml. of concentrated sulfuric acid, the solution is maintained at room temperature for 15 minutes, and then poured into 4500 ml. of ice water. The resulting yellow solid is collected, washed with water, and dissolved in dichloromethane. The dried solution is evaporated and the residue (6.9 g.) is triturated with 30 ml. of ethanol to give 6.0 g. of crystalline product, M.P. 155°–156° dec. Ultraviolet maxima at 255 ($\epsilon$8600) and 391 m$\mu$ ($\epsilon$5650); infrared absorption at 1634, 1620, 1584, and 1550 cm.$^{-1}$.

Analysis for $C_{12}H_9NO_4S$.—Calc.: C, 54.77; H, 3.45; N, 5.32; S, 12.18. Found: C, 54.62; H, 3.49; N, 5.25; S, 12.31.

EXAMPLE 3.—7,8-DIHYDRO-8-HYDROXY-11 - ISOPROPYLOXY - 8 - METHYLPYRIDO[1,2 - b][1,2] BENZOTHIAZIN-10(9H)-ONE 5,5-DIOXIDE

A mixture of 86 g. (0.28 mol) of 2-acetonyl-3-acetyl-2H-1,2-benzothiazin-4(3H)-one 1,1-dioxide, 215 g. of potassium carbonate, 170 g. (1.0 mol) of isopropyl iodide, and 2800 ml. of acetone gives refluxed with stirring for 113 hours. The acetone is distilled off and the residue is partitioned between water and dichloromethane. The dried organic solution is evaporated to give a semisolid. Trituration with a warm mixture of 125 ml. of ethyl ether and 125 ml. of isopropyl ether and allowing to stand at room temperature gives 63.5 g. of a solid, M.P. 132°–137°. This is extracted in a Soxhlet apparatus for 18 hours using a mixture of 200 ml. of ethyl ether and 600 ml. of isopropyl ether as the solvent. The solution, from which crystals has already begun to separate is allowed to stand at room temperature to give 49.6 g. of 7,8-dihydro - 8 - hydroxy - 11 - isopropyloxy - 8 - methylpyrido-[1,2-b][1,2]benzothiazin-10(9H) - one 5,5 - dioxide, M.P. 147°–149° which gives a negative ferric chloride test. Recrystallization from a 50–50 mixture of ethyl ether and isopropyl ether gives an analytical sample, 147.5°–148.5°

$\nu_{max.}^{Nujol}$ 3380 (s), 1696 (s), 1580 (m) cm.$^{-1}$; $\nu_{max.}^{CH_2Cl_2}$ 3460 (w), 1700 (s), 1675 (m) cm.$^{-1}$; $\lambda_{max.}$ m$\mu$ ($\epsilon$) 246 (7400), 324 (9450), $\lambda_{min.}$ 230 (5900), 272 (3880)

Analysis for $C_{16}H_{19}NO_5S$.—Calc.: C, 56.96; H, 5.68; N, 4.15; S, 9.50. Found: C, 57.15; H, 5.56; N, 4.23; S, 9.68.

EXAMPLE 4.—8 - PHENYLPYRIDO[1,2-b][1,2]BENZOTHIAZIN-10,11-(7H,10aH)-DIONE 5,5-DIOXIDE

A solution of 12 g. of 7,8-dihydro-8-hydroxy-11-isopropyloxy - 8 - phenylpyrido[1,2 - b][1,2]benzothiazin-10(9H)-one 5,5-dioxide in 240 ml. of concentrated sulfuric acid is stirred at room temperature for 30 minutes. It is poured into 2400 ml. of ice water and the resulting orange precipitate is filtered off, washed well with water, and dissolved in dichloromethane. The dried solution is evaporated and the residue is triturated with petroleum ether to give 9.0 g. of 8-phenylpyrido[1,2-b][1,2]benzothiazin-10,11-(7H,1-aH)-dione 5,5-dioxide, M.P. 172°–175° dec. Recrystallization from a mixture of ethanol and dichloromethane gives 7.8 g. of material, M.P. 175°–176°

$\nu_{max.}^{Nujol}$ 1624 (s), 1595 (m), 1585 (m) 1570 (m), 1554 (m) cm.$^{-1}$; $\lambda_{max.}$ m$\mu$ ($\epsilon$) 265 (11,300), 306 (12,800), 411 (9700), $\lambda_{min.}$ 242 (8200), 279 (8950), 367 (4820)

Analysis for $C_{18}H_{13}NO_4S$.—Calc.: C, 63.70; H, 3.86; N, 4.13; S, 9.45. Found: C, 63.94; H, 3.68; N, 4.13; S, 9.55.

EXAMPLE 5.—8-METHYLPYRIDO[1,2][1,2]BENZOTHIAZIN-10,11-(7H,10aH)-DIONE 5,5-DIOXIDE

A solution of 13.3 g. of 7,8-dihydro-8-hydroxy-11-isopropyloxy - 8 - methylpyrido[1,2 - b][1,2]benzothiazin-10(9H)-one 5,5-dioxide in 240 ml. of concentrated sulfuric acid is stirred at room temperature for 30 minutes. It is poured into 2400 ml. of ice water. The resulting yellow precipitate is collected by filtration, washed well with water, and dissolved in dichloromethane. The dried solution is evaporated and the residue is triturated with petroleum ether to give 5.1 g. of 8-methylpyrido[1,2-b][1,2]benzothiazin-10,11-(7H,10aH)-dione 5,5-dioxide, M.P. 164°–166° dec. Recrystallization from a mixture of ethanol and dichloromethane gives material, M.P. 167°–168° dec.

$\nu_{max.}^{Nujol}$ 1644 (m), 1610 (m), 1580 (m), 1550 (m) cm.$^{-1}$, $\lambda_{max.}$ m$\mu$ ($\epsilon$) 255 (14,900), 394 (9200), $\lambda_{min.}$ 230 (5400); 294 (2000)

Analysis for $C_{13}H_{11}NO_4S$.—Calc.: C, 53.31; H, 4.00; N, 5.05; S, 11.56. Found: C, 56.43; H, 3.78; N, 4.84; S, 11.55.

EXAMPLE 6.—7,8 - DIHYDRO-8-HYDROXY-11-ISOPROPYLOXY - 8 - PHENYLPYRIDO[1,2 - b][1,2] BENZOTHIAZIN-10(9H)-ONE 5,5-DIOXIDE

A mixture of 50 g. (0.14 mol) of 3-acetyl-2-phenacyl-2H-1,2-benzothiazin-4(3H)-one 1,1-dioxide, 101 g. of potassium carbonate, 85 g. (0.5 mol) of isopropyl iodide, and 1500 ml. of acetone is refluxed with stirring for 113 hours. The acetone is distilled off and the residue is partitioned between water and dichloromethane. The dichloromethane solution is washed successively with cold 1 N sodium hydroxide and with water, dried, and evaporated to give a gummy residue. This is triturated with 40 ml. of acetonitrile to give 14.4 g. of 7,8-dihydro-8-hydroxy - 11 - isopropyloxy - 8 - phenylpyrido[1,2-b][1,2] benzothiazin-10(9H)-one 5,5-dioxide, M.P. 190°–192°. Recrystallization from acetonitrile gives material, M.P. 191°–194°;

$\nu_{max.}^{Nujol}$ 3380 (s), 1686 (s), 1582 (m) cm.$^{-1}$; $\lambda_{max.}$ m$\mu$ ($\epsilon$) 246 (7340), 326 (10,000), $\lambda_{min.}$ 232 (6300), 274 (4000)

Analysis for $C_{21}H_{21}NO_5S$.—Calc.: C, 63.14; H, 5.30; N, 3.51; S, 8.03. Found: C, 63.43; H, 5.30; N, 3.53; S, 8.24.

EXAMPLE 7.—7,8-DIHYDRO - 8 - METHYLPYRIDO [1,2 - b][1,2]BENZOTHIAZIN - 10,11 - (9H,10aH)-DIONE 5,5-DIOXIDE

A mixture of 1.9 g. (0.0069 mol) of 8-methylpyrido-[1,2-b]benzothiazin-10,11-(9H,10aH) - dione 5,5-dioxide, 150 mg. of 10% palladium on carbon and 100 ml. of glacial acetic acid is hydrogenated at atmospheric pressure for 7 hours. The catalyst is filtered off and the solvent is removed in vacuo using a rotary flash evaporator at a maximum temperature of 40°. The residue is triturated with water and the resulting solid is collected, washed well with water and dissolved in dichloromethane. The dried solution is evaporated and the residue is triturated with petroleum ether to give 1.4 g. of 7,8-dihydro-8 - methylpyrido[1,2 - b][1,2]benzothiazin - 10,11 - (9H, 10aH)-dione 5,5-dioxide, M.P. 135°–136°; the n.m.r. spectrum shows the absence of olefinic hydrogen. Recrystallization from a small amount of ethanol gives material, M.P. 138°–139°;

$\nu_{max.}^{Nujol}$ 1622 (w), 1580 (m), 1546 (m) cm.$^{-1}$; $\lambda_{max.}$ m$\mu$ ($\epsilon$) 258 (8200), 380 (10,000), $\lambda_{min.}$ 230 (3280), 289 (2000)

Analysis for $C_{13}H_{13}NO_4S$.—Calc.: C, 55.90; H, 4.69; N, 5.01; S, 11.48. Found: C, 56.09; H, 4.85; N, 4.95; S, 11.59.

EXAMPLE 8.—7,8-DIHYDRO - 8 - PHENYLPYRIDO-[1,2 - b][1,2]BENZOTHIAZIN - 10,11-(9H,10aH)-DIONE 5,5-DIOXIDE

A slurry of 7.5 g. (0.022 mol) of recrystallized 8-phenylpyrido[1,2 - b][1,2]benzothiazin - 10,11-(9H,10aH)-dione 5,5-dioxide and 300 mg. of 10% palladium on carbon in 500 ml. of ethanol is hydrogenated at atmospheric pressure for 6 hours during which reaction has ceased with only 40% of the required hydrogen uptake. Complete hydrogenation requires the addition of two more 250 mg. portions of catalyst during a total of 8 additional hours of reaction time. The catalyst is filtered off and washed well with ethanol and dichloromethane. The filtrate is concentrated until severe bumping takes place and the mixture is allowed to stand at room temperature. The resulting solid is collected and washed with ethanol to give 5.6 g. of 7,8-dihydro-8-phenylpyrido[1,2-b][1,2]benzothiazin - 10,11-(9H,10aH)-dione 5,5 dioxide, M.P. 155°–160°. Recrystallization from a mixture of ethanol and dichloromethane gives material, M.P. 161°–162°

$\nu_{max.}^{Nujol}$ 1641 (m), 1590 (m), 1550 (m) cm.$^{-1}$; $\lambda_{max.}$ m$\mu$ ($\epsilon$) 258 (7300), 380 (9800), $\lambda_{min.}$ 231 (3800), 292 (2100)

Analysis for $C_{18}H_{15}NO_4S$.—Calc.: C, 63.33; H, 4.43; N, 4.10; S, 9.39. Found: C, 63.07; H, 4.43; N, 3.84; S, 9.35.

EXAMPLE 9.—4 - ISOPROPOXY - 3-(1-METHYL-1,3-DIOXOLAN - 1-YL) - 2H - 1,2-BENZOTHIAZIN-2-ETHANOL 1,1-DIOXIDE

A mixture of 90 g. (0.25 mol) of 3-acetyl-2-carbomethoxymethyl - 4 - isopropoxy-2H-1,2-benzothiazin 1,1-dioxide, 89.1 g. (1.25 mol) of ethylene glycol, 5.4 g. of p-toluenesulfonic acid monohydrate and 2000 ml. of benzene is placed in a flask equipped with a Dean-Stark water separator and is refluxed with vigorous stirring for 72 hours. The solvent is removed, and the residue is stirred with 2000 ml. of water and extracted with several 1000 ml. portions of ether. The ether solution is washed with water, dried, and concentrated to a volume of 1000 ml. It is then added to 31.5 g. (0.83 mol) of lithium aluminum hydride in 3000 ml. of ether, the temperature being maintained at 0°–5°. The reaction mixture is stirred at this temperature for 1.5 hours, hydrolyzed, and filtered. The filtrate is evaporated and the residue is triturated with 150 ml. of isopropyl ether to give 47.9 g. of crystalline 4 - isopropoxy-3-(1-methyl-1,3-dioxolan-1-yl)-2H - 1,2-benzothiazin-2-ethanol 1,1-dioxide, M.P. 146°–151°. Recrystallization of a portion from isopropyl ether gives an analytical sample, M.P. 155°–156°, ultraviolet maxima (95% EtOH) at 273 ($\epsilon$ 7055) and 300 m$\mu$ ($\epsilon$ 5840); infrared absorption (Nujol) at 3540 (s, OH), 1608, 1540 (w, C=C and arom).

Analysis for $C_{17}H_{23}NO_6S$.—Calc.: C, 55.27; H, 6.28; N, 3.79; S, 8.68. Found: C, 55.11; H, 6.32; N, 3.94; S, 8.73.

EXAMPLE 10.—3 - ACETYL-4-ISOPROPOXY-2H-1,2-BENZOTHIAZIN - 2 - ACETALDEHYDE 1,1-DIOXIDE

A mixture of 9.3 g. (0.025 mol) of 4-isopropoxy-3-(1-methyl - 1,3-dioxolan-1-yl)2H-1,2-benzothiazin-2-ethanol 1,1-dioxide, 15.7 g. (0.075 mol) of dicyclohexylcarbodimide, 1.5 g. (0.0125 mol) of pyridine hydrochloride, and 130 ml. of dimethylsulfoxide (distilled from calcium hydride) is stirred at room temperature for 18 hours and filtered. The filtrate is poured into 4000 ml. of 0.02 N hydrochloric acid, filtered, and the filtrate is extracted with ether. The ether solution is washed with water, dried, evaporated, and the residue is dissolved in a minimum amount of dichloromethane. Slow addition of petroleum ether and scratching causes precipitation of 5.4 g. of 3 - acetyl - 4 - isopropoxy-2H-1,2-benzothiazin-2-acetaldehyde 1,1-dioxide, M.P. 140°–145°. A portion is dissolved in dichloromethane and reprecipitated by the addition of petroleum ether to give an analytical sample, M.P. 147°–148°. Ultraviolet maxima at 238 ($\epsilon$ 5980), 300 sh ($\epsilon$ 7860), 320 m$\mu$ ($\epsilon$ 9640); infrared absorption at 1742 (s, —CHO) and 1680 (s, CH$_3$CO—) cm.$^{-1}$.

Analysis for $C_{15}H_{17}NO_5S$.—Calc.: C, 55.72; H, 5.30; N, 4.33; S, 9.92. Found: C, 55.64; H, 5.34; N, 4.27; S, 10.07.

It is understood that the foregoing detailed description is given merely by way of illustration and that many variations may be made therein without departing from the spirit of our invention.

Having described our invention, what we desire to secure by Letters Patent is:

1. Compounds of the formula:

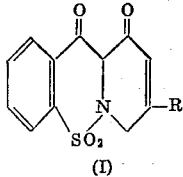    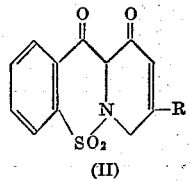

wherein R is hydrogen, lower alkyl or phenyl.

2. Pyrido[1,2 - b][1,2]benzothiazin-10,11-(7H,10aH)-dione 5,5-dioxide.

3. 8 - methylpyrido[1,2 - b][1,2]benzothiazin - 10,11-(7H,10aH)-dione 5,5-dioxide.

4. 8 - phenylpyrido[1,2 - b][1,2]benzothiazin - 10,11-(7H,10aH)-dione 5,5-dioxide.

5. 7,8 - dihydropyrido[1,2 - b][1,2]benzothiazin-10,11-(9H,10aH)-dione 5,5-dioxide.

6. 7,8 - dihydro - 8 - methylpyrido[1,2-b][1,2]benzothiazin-10,11-(9H,10aH)-dione 5,5-dioxide.

7. 7,8 - dihydro - 8 - phenylpyrido[1,2-b][1,2]benzothiazin-10,11-(9H,10aH)-dione 5,5-dioxide.

8. 7,8 - dihydro - 8 - hydroxy-11-isopropyloxy-8-methylpyrido[1,2 - b][1,2]benzothiazin - 10(9H)-one 5,5-dioxide.

9. 7,8 - dihydro - 8 - hydroxy-11-isopropyloxy-8-phenylpyrido[1,2 - b][1,2]benzothiazin - 10(9H)-one 5,5-dioxide.

10. 4 - isopropoxy - 3 - (1-methyl-1,3-dioxolan-1-yl)-2H-1,2-benzothiazin-2-ethanol 1,1-dioxide.

11. 3 - acetyl - 4 - isopropoxy-2H-1,2-benzothiazin-2-acetaldehyde 1,1-dioxide.

12. Process for the production of a compound of the formula:

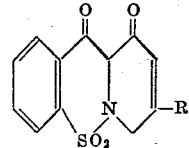

wherein R is lower alkyl or phenyl which comprises
(a) treating a compound of the formula:

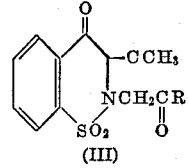

with isopropyl iodide and potassium carbonate in refluxing acetone to obtain a compound of the formula:

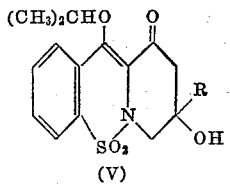

and
(b) dissolving said compound of structure (V) in concentrated sulfuric acid.

13. Process for the production of a compound of the formula:

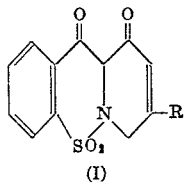

(I)

wherein R is hydrogen which comprises (a) treating a compound of the formula:

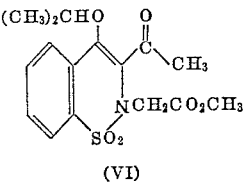

(VI)

with ethylene glycol and p-toluenesulfonic acid in refluxing benzene to give a compound of the formula:

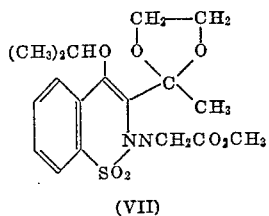

(VII)

(b) treating said Compound VII with lithium aluminum hydride to obtain a compound of the formula:

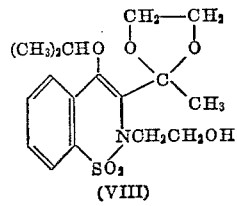

(VIII)

(c) treating said Compound VIII with dimethylsulfoxide, pyridine hydrochloride and dicyclohexylcarbodiimide followed by treatment with an aqueous acid to yield a compound of the formula:

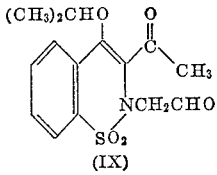

(IX)

(d) treating said Compound IX with potassium carbonate in refluxing acetone to give a compound of the formula:

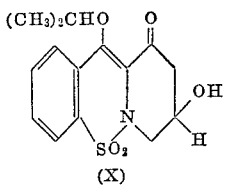

(X)

and (e) dissolving said Compound X in concentrated sulfuric acid.

References Cited

UNITED STATES PATENTS 3,198,793  8/1965  Hilger et al. _____ 260—243
3,284,450  11/1966 Kraaijeveld et al. ____ 260—243

HENRY R. JILES, *Primary Examiner.*

NORMA S. MILESTONE, *Examiner.*

J. M. FORD, *Assistant Examiner.*